United States Patent [19]

Yoshijima et al.

[11] Patent Number: 4,728,111
[45] Date of Patent: Mar. 1, 1988

[54] COMPRESSED ASBESTOS SHEET GASKET WHICH SWELLS IN PRESENCE OF LIQUIDS

[75] Inventors: Kazuya Yoshijima, Okazaki; Tsutomu Hayakawa, Yamanashi, both of Japan

[73] Assignees: Toyota Jidosha Kabushiki Kaisha, Toyota; Asahi Asbestos Co., Ltd., Tokyo, both of Japan

[21] Appl. No.: 928,979

[22] Filed: Nov. 10, 1986

[30] Foreign Application Priority Data

Nov. 22, 1985 [JP] Japan .................. 60-179184

[51] Int. Cl.⁴ ................. F16J 15/10; C09K 3/10
[52] U.S. Cl. ................. 277/235 B; 277/235 A; 277/DIG. 6; 428/290; 428/301; 428/443
[58] Field of Search ......... 277/1, DIG. 6, 227-229, 277/233, 234, 235 A, 235 B; 428/264, 290, 301, 443, 445

[56] References Cited

U.S. PATENT DOCUMENTS

| 3,427,776 | 2/1969 | Lake et al. ............... 49/475 X |
| 3,659,896 | 5/1972 | Smith et al. .............. 296/93 |
| 4,449,713 | 5/1984 | Ishido et al. ............. 277/227 X |
| 4,546,033 | 10/1985 | Tsuchimoto et al. ..... 277/DIG. 6 X |
| 4,558,875 | 12/1985 | Yamaji et al. ............ 277/227 |

FOREIGN PATENT DOCUMENTS

| 0055848 | 7/1982 | European Pat. Off. ......... 277/227 |
| 0037717 | 6/1984 | European Pat. Off. ......... 277/227 |
| 60-61524 | 4/1985 | Japan . |

Primary Examiner—Robert S. Ward
Attorney, Agent, or Firm—Kenyon & Kenyon

[57] ABSTRACT

A sheet gasket comprising a swelling sheet, a non-swelling layer laminated on the swelling sheet, and an adhesive layer coated on the surface of the non-swelling layer. This gasket is adapted to be inserted between flanges having different coefficients of thermal expansion, with the adhesive layer adhered to one of the flanges and the exposed swelling sheet adjacent to the other flange.

13 Claims, 2 Drawing Figures

COMPRESSED ASBESTOS SHEET GASKET WHICH SWELLS IN PRESENCE OF LIQUIDS

BACKGROUND OF THE INVENTION

1. Field of the Invention

The present invention relates to a gasket, in particular, to a sheet gasket adapted to be inserted between flanges having different coefficients of thermal expansion.

2. Description of the Related Art

Compressed sheet gaskets comprising asbestos fibers joined by rubber binders are used in many industrial fields, and a swelling agent can be included in such a gasket to improve the sealing capability. Such a gasket is known as a "swelling sheet gasket". When such a swelling sheet gasket is used, however, and inserted between flanges having different coefficients of thermal expansion, for example, between a cylinder block of cast iron and a cylinder head of aluminum alloy, a problem arises in that the gasket is subjected to the repeated expansion and contraction of the flanges and is gradually forced out from the flanges, resulting in damage to the gasket.

To solve this problem, Japanese Utility Model Application No. 60-61524, filed by the same assignee as for the present case, proposed that an adhesive be coated on one side of the swelling sheet gasket to adhere the gasket to one of the adjoining surfaces of the flanges. The swelling sheet gasket is secured to that flange surface by adhesive force and expands and contracts together with the expansion and contraction of the flange surface, and the other side of the swelling sheet gasket slides relative to the other adjoining flange surface to protect the gasket from damage. Under experimental conditions, however, it became apparent that if the entire swelling sheet gasket including the adhesive coating surface area expands in water and oil, the adhesive force is reduced and stabilizing effect of adhering one side of the gasket to the adjoining flange is decreased.

SUMMARY OF THE INVENTION

An object of the present invention is to solve the above problems and to provide a swelling sheet gasket having a prolonged life.

According to the present invention, there is provided a sheet gasket comprising a swelling sheet having opposed surfaces, which preferably will swell in water and in oil, a non-swelling layer laminated on one of the opposed surfaces, which will not swell in both water and oil, and an adhesive layer coated on the surface of that non-swelling layer.

BRIEF DESCRIPTION OF THE DRAWINGS

The other objects and advantages of the present invention will become apparent from the description of the preferred embodiment of the present invention in reference to the attached drawings, in which.

DESCRIPTION OF THE PREFERRED EMBODIMENT

Figure 1:
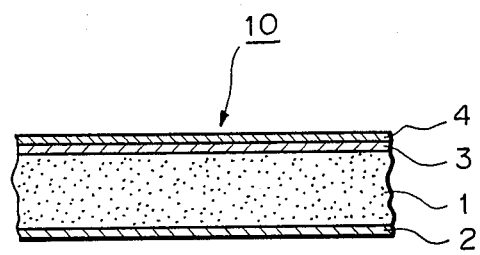
FIG. 1 is a view schematically illustrating, in section, a gasket according to the present invention.

FIG. 1 shows a sheet gasket 10, according to the present invention, formed of a swelling sheet 1 as a base material. A swelling layer 2 is laminated on one side of this base swelling sheet 1, and a non-swelling layer 3 is laminated on the other side of the base sheet 1, as surface layers. These surface layers 2 and 3 of the gasket 1 can be formed by a conventional roller forming process in which the material for the gasket 10 is fed between two rollers; the web passing through the gap between the rollers is wound around one of the rollers, which is hot; and the gap is then widened to allow the passage of the next web, which is wound on the first web, and this step is repeated. Thus, the gasket 10 is formed by a plurality of layers and the innermost and the outermost layers become the surface layers 20 and 3. Conventionally, these surface layers 2 and 3 are made from the same material as the internal base sheet.

In accordance with the present invention, one of the surface layers, namely, the swelling layer 2, is made from the same material as the base swelling sheet 1, and the other surface layer, namely, the non-swelling layer 3, is made from a material different from that of the base swelling sheet 1, so that the base swelling sheet 1 and swelling layer 2 swell in water and in oil, but the non-swelling layer 3 does not swell significantly in both water and oil.

In a preferred embodiment, the base swelling sheet 1 and swelling layer 2 are made from a composition of 68 percent asbestos fiber, 14 percent acrylonitrile-butadiene rubber (NBR), 12 percent hydrogel, with the remainder being fillers or the like, and the non-swelling layer 3 is made from a composition of 66 percent asbestos fiber, 15 percent natural rubber (NR), with the remainder being fillers or the like. As is clear from the above, acrylonitrile-butadiene rubber (NBR) and natural rubber (NR) are used as binders for the asbestos fiber in this case.

Some rubber binders may have a swelling agent property, but the swelling of rubber binders occurs only in oil. Rubber binders do not swell significantly in water. In the illustrated example, the acrylonitrile-butadiene rubber (NBR) swells in oil, but the natural rubber (NR) does not swell significantly in oil. Thus, the non-swelling layer 3 does not include a swelling agent for water and oil. The base swelling sheet 1 and swelling layer 2 include acrylonitrile-butadiene rubber (NBR) as the swelling agent for oil, and a further swelling agent hydrogel, which swells in water and oil and typically comprises either a starch-acrylic compound or polyvinyl alcohol. The filler may be a silicate.

It will be clear that the appearance of the non-swelling layer 3 is similar to those of the base swelling sheet 1 and swelling layer 2, since they all basically include asbestos, but the non-swelling sheet layer 3 materially differs from the base swelling sheet 1 and swelling layer 2 in that it does not include a swelling agent.

An adhesive layer 4 is located on the surface of this non-swelling layer 3. Preferably, this adhesive layer 4 is a thermosetting type of adhesive which maintains a substantially constant adhesive force under variable temperatures after it is once heated and adhered to a flange. The adhesive layer 4 typically comprises nitrocellulose, modified alkyd resin, and a plasticizer. Alternatively, the adhesive layer 4 may comprise epoxy resin and a phenolic hardener.

Figure 2:
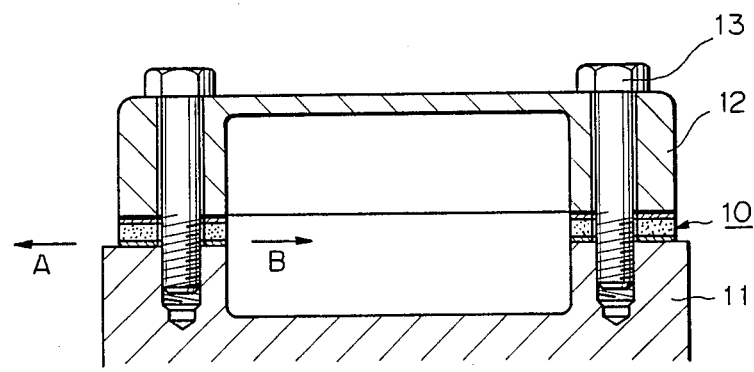
FIG. 2 is a view illustrating the gasket of FIG. 1 inserted between flanges.

FIG. 2 illustrates the gasket 10 of FIG. 1 inserted between a cast iron flange 11 and an aluminum alloy flange 12, with bolts 13 for joining and tightening the flanges 11 and 12. When water and oil are fed through respective passageways defined in the flanges 11 and 12, the base swelling sheet 1 and swelling layer 2 swell in water and in oil to cause an expansion of the volume thereof, and thus provide a good sealing capability. The non-swelling layer 3 does not swell significantly in water and in oil, and thus maintains its original configuration when adhered to the aluminum alloy flange 12 by applying heat during the assembly thereof. The non-swelling layer 3 substantially prevents the water and the oil from passing from the base swelling sheet 1 toward the adhesive layer 4, thereby assuring that the adhesive force of the adhesive layer 4 is maintained.

When the assembly of FIG. 2 is subjected to heat, both the cast iron flange 11 and the aluminum alloy flange 12 thermally expand in the direction indicated by the arrow A. Due to the difference in the coefficient of thermal expansion, the amount of expansion of the aluminum alloy flange 12 is greater than that of the cast iron flange 11. Thus, the gasket 10 is subjected to a different expansion force on either side thereof. In this situation, the gasket 10 follows the aluminum alloy flange 12 and expands therewith, sliding outwardly relative to the cast iron flange 11. When the heat is dispersed, both the cast iron flange 11 and the aluminum alloy flange 12 cool and contract in the direction indicated by the arrow B. In this situation too, the gasket 10 follows the aluminum alloy flange 12 and contracts therewith, sliding inwardly relative to the cast iron flange 11. Thus, the gasket returns to tis original position.

It should be understood that the gasket 10, according to the present invention, is securely adhered to the aluminum alloy flange 12, to prevent the gasket 10 from being forced out from between the flanges 11 and 12, and thus its life is prolonged. It should be also understood that the gasket 10 is a swelling sheet gasket which can provide an improved sealing capability by swelling in water and in oil, and maintains this improved sealing capability over a long term because it is adhered to one of the flanges 11 and 12.

We claim:

1. A gasket comprising
a swelling sheet having opposed surfaces;
a non-swelling layer having two opposed faces, one face being laminated to one of said opposed surfaces of the swelling sheet; and
an adhesive layer coated on the other face of said non-swelling layer.

2. A gasket according to claim 1, wherein said swelling sheet comprises components causing said swelling sheet to swell in water and in oil, and said non-swelling layer comprises components causing said non-swelling layer substantially not to swell in water.

3. A gasket according to claim 2, wherein said non-swelling layer comprises components causing said non-swelling layer substantially not to swell in water or in oil.

4. A gasket according to claim 3, wherein said swelling sheet comprises an asbestos, a first rubber binder, and a swelling agent other than said rubber binder, and said non-swelling layer comprises an asbestos of a kind substantially identical to that of said swelling sheet and a second rubber binder, but does not include the swelling agent.

5. A gasket according to claim 4, wherein said first and said second rubber binders are identical.

6. A gasket according to claim 4, wherein said first rubber binder is acrylonitrile-butadiene rubber and said second rubber binder is natural rubber.

7. A gasket according to claim 4, wherein said swelling agent comprises a hydrogel swellable in water.

8. A gasket according to claim 7, wherein said hydrogel is a starch-acrylic compound.

9. A gasket according to claim 7, wherein said hydrogel is a polyvinyl alcohol.

10. A gasket according to claim 7, wherein said swelling sheet and said non-swelling layer further comprise fillers, respectively.

11. A gasket according to claim 1, wherein said adhesive layer is a thermosetting type which maintains a substantially constant adhesive force under variable temperatures after said adhesive is once heated and adhered to a flange.

12. A gasket according to claim 11, wherein said adhesive layer comprises nitrocellulose, modified alkyd resin, and a plasticizer.

13. A gasket according to claim 11, wherein said adhesive layer comprises epoxy resin and a phenolic hardener.

* * * * *